(12) United States Patent
Chen

(10) Patent No.: US 9,319,305 B2
(45) Date of Patent: Apr. 19, 2016

(54) NEXT HOP INGRESS PROTECTION OF LABEL SWITCHED PATHS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 28 days.

(21) Appl. No.: 14/306,855

(22) Filed: Jun. 17, 2014

(65) Prior Publication Data
US 2014/0369185 A1 Dec. 18, 2014

Related U.S. Application Data

(60) Provisional application No. 61/836,514, filed on Jun. 18, 2013.

(51) Int. Cl.
| | |
|---|---|
| *H04L 1/00* | (2006.01) |
| *H04L 12/707* | (2013.01) |
| *H04L 12/24* | (2006.01) |
| *H04L 12/723* | (2013.01) |

(52) U.S. Cl.
CPC ............ *H04L 45/22* (2013.01); *H04L 41/0663* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 7,626,925 | B1* | 12/2009 | Sivabalan | ................. H04J 3/14 370/228 |
| 2003/0043792 | A1* | 3/2003 | Carpini | ................... H04L 45/00 370/386 |
| 2007/0159963 | A1* | 7/2007 | Qing | ................... H04L 41/0668 370/228 |
| 2010/0177631 | A1 | 7/2010 | Chen et al. | |
| 2011/0199891 | A1 | 8/2011 | Chen | |
| 2011/0280123 | A1* | 11/2011 | Wijnands | .............. H04L 45/507 370/228 |
| 2012/0069745 | A1 | 3/2012 | Kini et al. | |

FOREIGN PATENT DOCUMENTS

| | | |
|---|---|---|
| CN | 103098426 A | 5/2013 |
| WO | 2011103817 A1 | 9/2011 |

OTHER PUBLICATIONS

Foreign Communication From a Counterpart Application, PCT Application No. PCT/CN2014/080218, International Search Report, dated Sep. 22, 2014, 7 pages.

(Continued)

*Primary Examiner* — Otis L Thompson, Jr.
(74) *Attorney, Agent, or Firm* — Conley Rose, P.C.; Grant Rodolph; Adam J. Stegge

(57) ABSTRACT

A network node for providing ingress fault protection. The network node may be along a primary label switched path (LSP) and may be configured to receive an ingress protection request message that identifies one or more other network nodes along the primary LSP. The network node may generate a forwarding table that comprises one or more forwarding entries for the other network nodes along the primary LSP and one or more forwarding entries for the other network nodes along a backup LSP. In typical operation, the network node may receive data traffic from a first source path within a label switched network and may send the data traffic using the primary LSP. When an ingress node fault in the first source path is present, the network node may receive data traffic from a second source path and may send the data traffic using the backup LSP.

19 Claims, 9 Drawing Sheets

(56) References Cited

OTHER PUBLICATIONS

Foreign Communication From a Counterpart Application, PCT Application No. PCT/CN2014/080218, Written Opinion, dated Sep. 22, 2014, 5 pages.

Yasukawa, S., Ed., "Signaling Requirements for Point-to-Multipoint Traffic-Engineered MPLS Label Switched Paths (LSPs)," RFC 4461, Apr. 2006, 30 pages.

Narten, T., et al., "Assigning Experimental and Testing Numbers Considered Useful," RFC 3692, Jan. 2004, 7 pages.

Berger, L., Ed., "Generalized Multi-Protocol Label Switching (GMPLS) Signaling Resource ReSerVation Protocol—Traffic Engineering (RSVP-TE) Extensions," RFC 3473, Jan. 2003, 42 pages.

Le Roux, J.L., et al., "P2MP MPLS-TE Fast Reroute with P2MP Bypass Tunnels," draft-leroux-mpls-p2mp-te-bypass-01.txt, Mar. 2007, 11 pages.

Chen, H., Ed., et al., "Extensions to RSVP-TE for LSP Ingress Local Protection," draft-ietf-mpls-rsvp-ingress-protection-00.txt, Mar. 17, 2014, 28 pages.

Reynolds, J., et al., "Assigned Numbers," RFC 1700, Oct. 1994, 230 pages.

Bradner, S., et al., "Key Words for use in RFCs to Indicate Requirement Levels," RFC 2119, Mar. 1997, 3 pages.

Braden, R., Ed., et al., "Resource ReSerVation Protocol (RSVP)—Version 1 Functional Specification," RFC 2205, Sep. 1997, 112 pages.

Awduche, D., et al., "Requirements for Traffic Engineering Over MPLS," RFC 2702, Sep. 1999, 29 pages.

Rosen, E., et al., "Multiprotocol Label Switching Architecture," RFC 3031, Jan. 2001, 61 pages.

Rosen, E., et al., "MPLS Label Stack Encoding," RFC 3032, Jan. 2001, 23 pages.

Awduche, D., et al., "RSVP-TE: Extensions to RSVP for LSP Tunnels," RFC 3209, Dec. 2001, 61 pages.

Berger, L., Ed., et al., "Generalized Multi-Protocol Lbael Switching (GMPLS) Signaling Resource ReserVation Protocol-Traffic Engineering (RSVP-TE) Extensions," RFC 3473, Jan. 2003, 42 pages.

Narten, T., et al. "Assigning Experimental and Testing Numbers Considered Useful," RFC 3692, Jan. 2004, 7 pages.

Pan, P., Ed., et al., "Fast Reroute Extensions to RSVP-TE for LSP Tunnels," RFC 4090, May 2005, 38 pages.

Yasukawa, S., Ed., et al., "Singaling Requirements for Point-to-Multipoint Traffic-Engineered MPLS Label Switched Paths (LSPs)," RFC 4461, Apr. 2006, 30 pages.

Aggarwal, R., Ed., et al., "Extensions to Resource Reservation Protocol—Traffic Engineering (RSVP-TE) for Point-to-Multipoint TE Label Switched Paths (LSPs)," RFC 4875, May 2007, 53 pages.

Atlas, A., et al., "Ingress Protection for RSVP-TE p2p and p2mp LSPs," draft-torvi-mpls-rsvp-ingress-protection-00, Jul. 9, 2012, 11 pages.

Le Roux, J.L., et al., "P2MP MPLS-TE Fast Reroute with P2MP Bypass Tunnels," draft-leroux-mpls-p2mp-te-bypass-01, Mar. 2007, 11 pages.

Chen, H., et al., "Extensions to RSVP-TE for P2MP LSP Ingress Local Protection," draft-chen-mpls-p2mp-ingress-protection-07, Oct. 22, 2012, 16 pages.

* cited by examiner

NEXT HOP INGRESS PROTECTION OF LABEL SWITCHED PATHS

CROSS-REFERENCE TO RELATED APPLICATIONS

The present application claims the benefit of U.S. Provisional Patent Application No. 61/836,514 filed Jun. 18, 2013 by Huaimo Chen and entitled, "Next Hop Protection of Label Switched Path Ingress," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a conventional multiprotocol label switching (MPLS) traffic engineering (TE) label switching path (LSP) system, a second LSP may be employed as a backup LSP to a primary LSP to protect the primary LSP in the event of a primary ingress node fault. The second LSP may be resource consuming because the second LSP may use additional network bandwidth that can be comparable to the reserved bandwidth of the first LSP. Furthermore, the second LSP may reroute data traffic that causes a delay in traffic delivery. Such a delay may not be acceptable in some systems (e.g., for real time services such as internet protocol (IP) television). Conventional systems may also incorrectly detect a fault of the primary ingress node for the primary LSP. An incorrect failure detection of the primary ingress node may result in both the primary ingress node of the primary LSP and a backup ingress node of the second LSP delivering the same data traffic to a next-hop node of the primary ingress node. The duplicate traffic being delivered to the next-hop node of the primary ingress node may cause service interruptions. Additionally, the location of a backup ingress node within a second LSP may be limited. For example, a backup ingress node may not be a next-hop of a primary ingress node along a primary LSP.

SUMMARY

In one example embodiment, the disclosure includes a network node to provide ingress fault protection of a primary LSP. The network node may be configured to receive path information that identifies one or more network nodes along a primary LSP. The network node may create a backup LSP to the other node and generate one or more forwarding entries along a backup LSP for other network nodes identified in the path information. Data traffic may be communicated from a first source path to the other network nodes. In response to detecting an ingress node failure of the first source path, data traffic may be received from a second source path. The data traffic from the second source path may be sent to the other network nodes using the backup LSP.

In another example embodiment, the disclosure includes a network node to provide ingress fault protection of a primary LSP. The network node may be configured to receive an ingress protection request message that identifies one or more other network nodes along a primary LSP. The network node may create a backup LSP for the other nodes and may generate a forwarding table that comprises one or more forwarding entries for the other network nodes along the primary LSP and one or more forwarding entries for the other network nodes along a backup LSP. In typical operation, the network node may receive data traffic from a first source path within a label switched network and may send the data traffic using the primary LSP. When an ingress node fault occurs in the first source path, the network node may receive data traffic from a second source path and may send the data traffic using the backup LSP.

In yet another example embodiment, the disclosure includes a network node to provide ingress fault protection of a primary LSP. The network node may be configured to receive an ingress protection message that identifies the network node as a backup ingress node and that identifies one or more other network nodes along a primary LSP and to receive data traffic. The network node may also be configured to create a backup LSP to the other network nodes and to generate a forwarding table that comprises one or more forwarding entries for the other network nodes along the primary LSP and one or more forwarding entries for the network nodes along a backup LSP. The network node may be configured to receive data traffic from a first source path when an ingress node fault along the first source path is not present and to receive data traffic from a second source path when the ingress node fault along the first source path is present. The network node may be configured to transmit data traffic using the primary LSP when the ingress node fault along the first source path is not present and to transmit data traffic using a backup LSP when the ingress node fault along the first source path is present.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for establishing a backup LSP, detecting a failure involving a primary ingress node of an LSP, generating one or more forwarding entries for the backup LSP, and controlling the data traffic delivery from a source node to one or more next-hop nodes of the primary ingress node via a backup ingress node and the backup LSP. The data traffic may be delivered from a network and/or a source node to one or more next-hop nodes of the primary ingress node via the backup ingress node and the backup LSP. A network, a source node, and/or a backup ingress node may detect a failure of a primary ingress node of a primary LSP and may reroute the data traffic to the next-hop nodes of the primary ingress node via the backup ingress node and a backup LSP. The failure of the primary ingress node may be determined by employing one or more fault detection links in order to reduce false-positive failure detections of a primary ingress node. Upon determining a primary ingress node failure has occurred (e.g., not a link-failure), the backup ingress node may activate the backup LSP and deliver traffic to the next-hop node of the primary ingress node via the backup LSP. The backup ingress node may prevent duplicate traffic from being delivered in response to a false-positive detection of a primary ingress node. Some examples of protection against failures involving the primary ingress node of an MPLS TE LSP are described in U.S. patent application Ser. No. 12/683,968, titled "Protecting Ingress and Egress of a Label Switched Path," and U.S. application Ser. No. 12/983,587, titled "System and Method for Protecting Ingress and Egress of a Point-To-Multipoint Label Switched Path," both of which are incorporated herein by reference.

Figure 1:
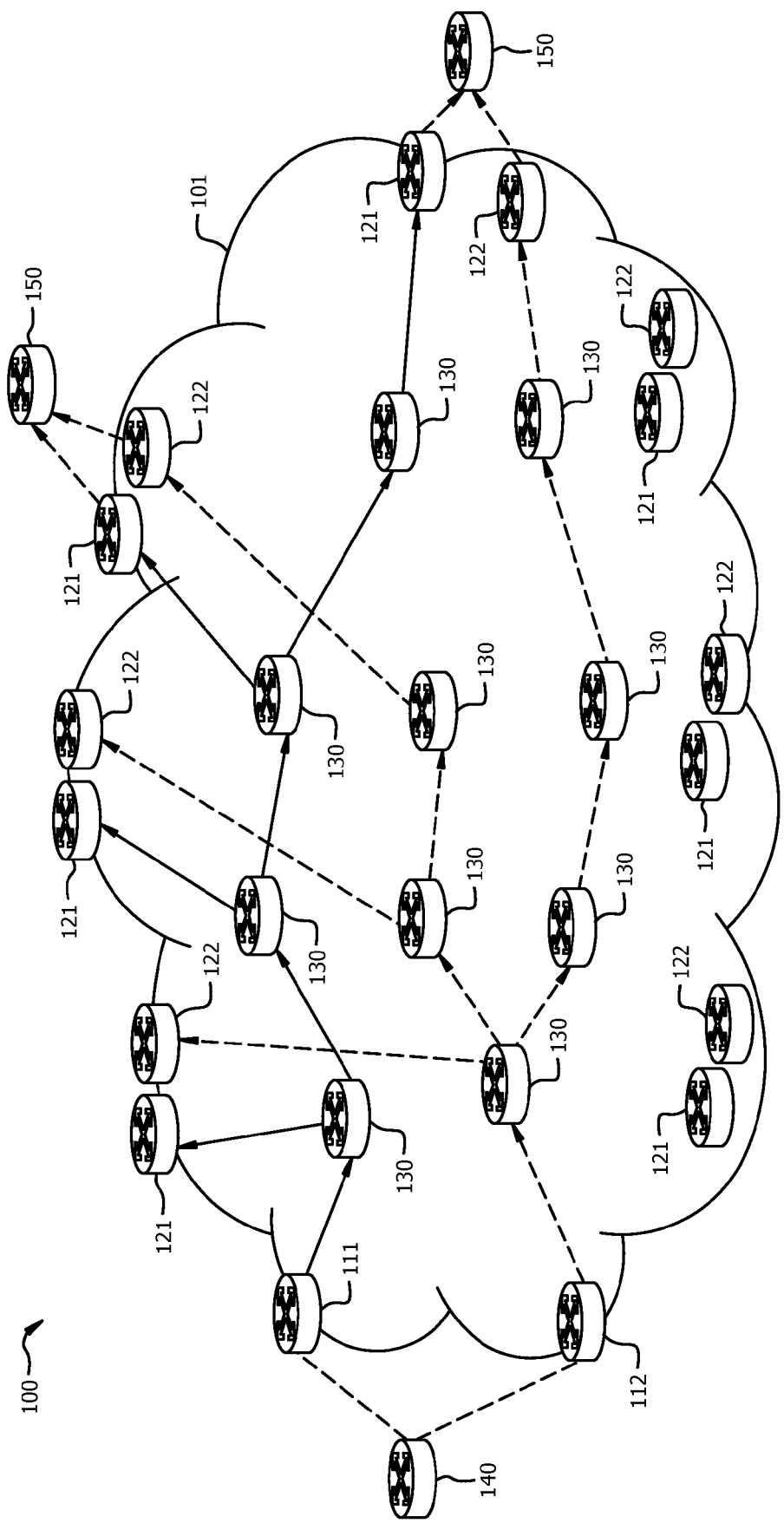
FIG. 1 is a schematic diagram of an example embodiment of a label switched system where embodiments of the present disclosure may operate.

FIG. 1 is a schematic diagram of an example embodiment of a label switched system 100, where embodiments of the present disclosure may operate. The label switched system 100 comprises a plurality of source nodes 140 in data communication with a plurality of client nodes 150 via a label switched network 101 (e.g., a packet switched network) that comprises a plurality of network nodes. The label switched network 101 may be configured to route or switch data traffic (e.g., data packets or frames) along paths that are established using a label switching protocol, for example, using MPLS or generalized multiprotocol label switching (GMPLS). Alternatively, the packets may be routed or switched via paths established using any other suitable protocol as would be appreciated by one of ordinary skill in the art upon viewing this disclosure. The label switched network 101 may be configured to establish a plurality of LSPs between at least some of the network nodes and/or between the source node 140 and at least some of the network nodes. An LSP may be a point-to-point (P2P) LSP or point-to-multipoint (P2MP) LSP and may be used to transport data traffic (e.g., using packets and packet labels for routing).

The plurality of network nodes may be a plurality of egress nodes 121, 122 and a plurality of internal nodes 130. The egress nodes 121, 122 and internal nodes 130 may be any devices or components that support the transportation of data traffic (e.g., data packets) through the label switched network 101. For example, the network nodes may include switches, routers, and any other suitable network device for communicating packets as would be appreciated by one of ordinary skill in the art upon viewing this disclosure, or combinations thereof. The network nodes may be configured to receive data from other network nodes, to determine which network nodes to send the data to (e.g., via logic circuitry or a forwarding table), and/or to transmit the data to other network nodes. In some example embodiments, at least some of the network nodes may be label switched routers (LSRs) and may be configured to modify or update the labels of the packets transported in the label switched network 101. Additionally, at least some of the network nodes may be label edge routers (LERs) and may be configured to insert or remove the labels of the packets transported between the label switched network 101 and a source node 140 and/or a client node 150.

A source node 140 and/or a client node 150 may be a network or network node that is external or distinct from the label switched network 101. Alternatively, a source node 140 and/or a client node 150 may be a portion of and/or incorporated within the label switched network 101. The label switched network 101 comprises a first ingress node (e.g., a primary ingress node) 111, a second ingress node (e.g., a backup ingress node) 112, a plurality of internal nodes 130, a plurality of first egress nodes (e.g., a primary egress node) 121, and a plurality of second egress nodes (e.g., a backup egress node) 122. Although the label switched network 101 is illustrated comprising a first ingress node 111, a second ingress node 112, a plurality of internal nodes 130, a plurality of first egress nodes 121, and a plurality of second egress nodes 122, in one or more example embodiments, any other suitable configuration and/or combinations thereof may be additionally or alternatively incorporated within the label switched network 101 as would be appreciated by one of ordinary skill in the art upon viewing this disclosure.

The label switched network 101 may be configured such that a plurality of LSPs (e.g., P2P LSP and/or P2MP LSP) may be established between the network nodes and/or between the networks and at least some of the network nodes. The label switched network 101 may comprise a primary LSP (e.g., a P2P LSP) configured to transport data traffic from a source node 140 to a client node 150. The primary LSP may comprise the first ingress node 111, one or more internal nodes 130, and a first egress node 121. The label switched network 101 further comprises a backup LSP (e.g., a backup P2P LSP). The backup LSP may comprise one or more bypass P2P LSPs and/or P2MP LSPs.

The backup LSP may be a P2P detour tunnel. The backup LSP may be created by computing a path from the second ingress node 112 to one or more next-hop nodes of the first ingress node 111, setting up the backup LSP along the computed path, sending a path (PATH) message to the second ingress node 112 comprising an ingress fault protection message object, receiving a reservation (RESV) message in response to the PATH message, and creating one or more forwarding states (e.g., forwarding table) for the backup LSP. The ingress fault protection message object may be as described in FIG. 7. In an example embodiment, the backup LSP may be established as described in U.S. patent application Ser. No. 12/683,968, titled "Protecting Ingress and Egress of a Label Switched Path." The PATH and RESV messages may be similar to the PATH and RESV messages defined by the Internet Engineering Task Force (IETF) Request for Comments (RFC) 6510.

Figure 2:
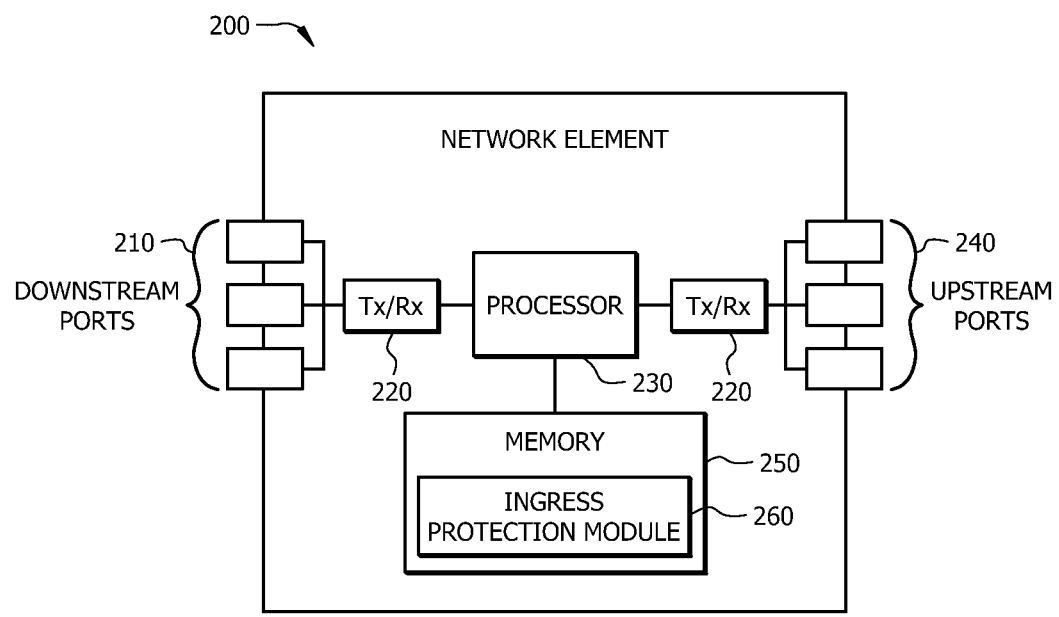
FIG. 2 is a schematic diagram of an example embodiment of a network element.

FIG. 2 is a schematic diagram of an example embodiment of a network element 200 that may be used to transport and process traffic through at least a portion of a network 100 shown in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., an access point, an access point station, a server, a client, a user-equipment, a mobile communications device, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one example embodiment, the network element 200 may be an apparatus configured to implement ingress fault protection. For example, network element 200 may be or incorporated within a second ingress node 112 or an internal node 130 as described in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another example embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to generate a backup LSP, generate one or more forwarding entries for the backup LSP, detect a fault of a primary ingress node, activate the forwarding entries, and send data traffic using the backup LSP and the forwarding entries.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise an ingress protection module 260 that may be implemented on the processor 230. In one example embodiment, the ingress protection module 260 may be implemented on a backup ingress node (e.g., a second ingress node 112 or an internal node 130 as described in FIG. 1) to implement an ingress node protection scheme, such as method 1100 as described in FIG. 11. For instance, the backup ingress node may use the ingress protection module 260 to generate one or more forwarding entries for other network nodes of a primary LSP using a backup LSP and may send data traffic to the other network nodes using the backup LSP when a primary ingress node fault occurs.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
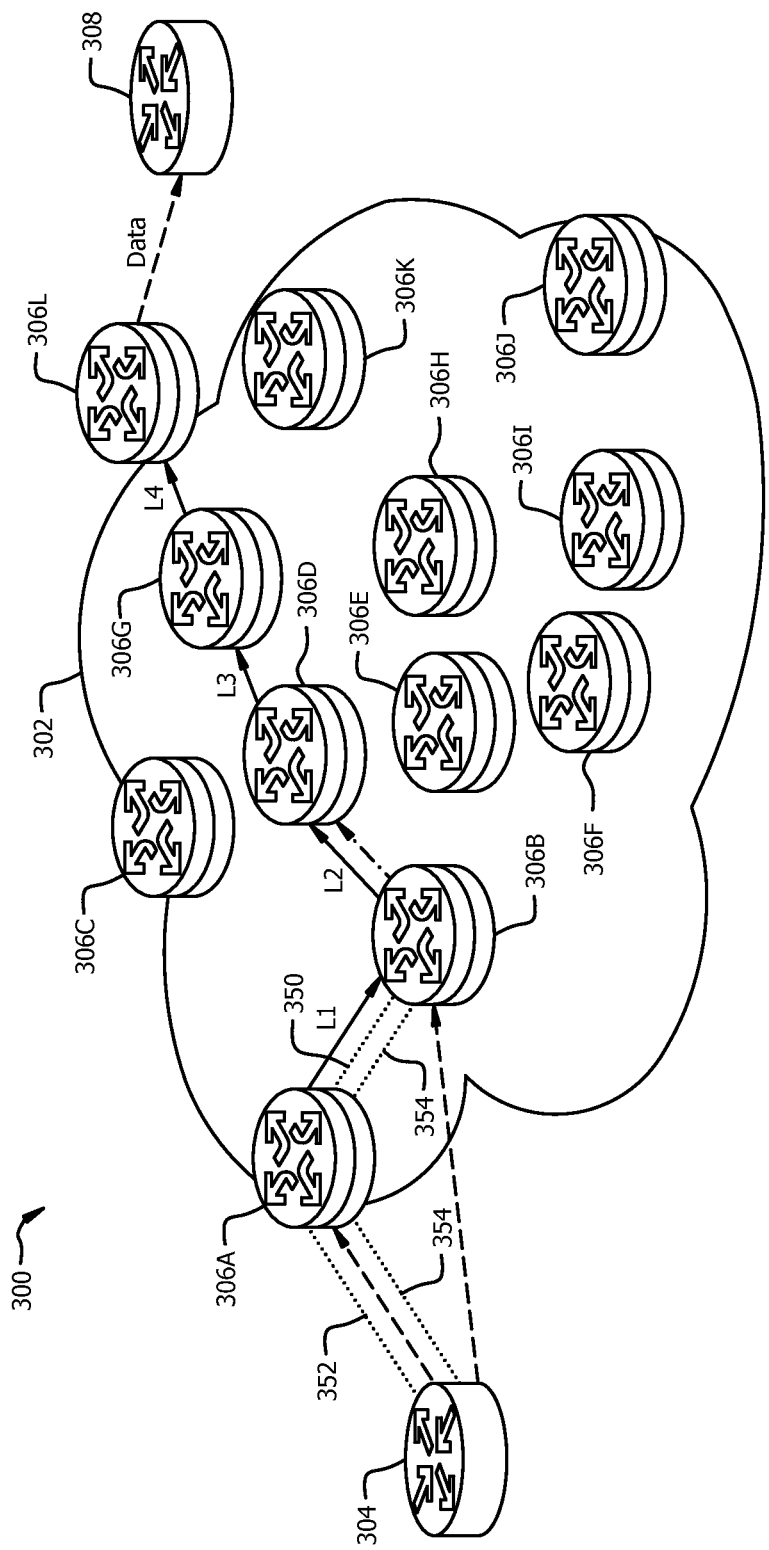
FIG. 3 is a schematic diagram of an example embodiment of a label switched system employing ingress node protection.

FIG. 3 is a schematic diagram of an example embodiment of a label switched system 300 employing ingress node protection. The label switched system 300 comprises a label switched network 302 comprising a plurality of network nodes 306A-306L. In particular, a primary ingress node 306A, a backup ingress node 306B, a plurality of internal nodes 306C-306K, and an egress node 306L. The primary ingress node 306A may be substantially similar to the first ingress node 111 described in FIG. 1, the backup ingress node 306B may be substantially similar to the second ingress node 112 described in FIG. 1, the plurality of internal nodes 306C-306K may be substantially similar to the internal nodes 130 described in FIG. 1, and the egress node 306L may be substantially similar to the first egress node 121 or the second egress node 122 described in FIG. 1. The backup ingress node 306B may be an ingress node or an internal node. Although the label switched network 302 is illustrated comprising the primary ingress node 306A, the backup ingress node 306B, the plurality of internal nodes 306C-306K, and the egress node 306L, in one or more example embodiments, any other suitable configuration and/or combinations thereof may be additionally or alternatively incorporated within the label switched network 302 as would be appreciated by one of ordinary skill in the art upon viewing this disclosure. The label switched network 302 may be in data communication with a source node 304 and a client node 308. The source node 304 and/or the client node 308 may be a network or a network node that is external or distinct from the label switched network 302. Alternatively, the source node 304 and/or the client node 308 may be a portion of and/or incorporated within the label switched network 302.

The label switched system 300 may be configured to employ one or more LSPs (e.g., one or more P2P LSPs and/or P2MP LSPs) to communicate data traffic from the source node 304 to the client node 308. In FIG. 3, label switched network 302 may be configured to employ a P2P primary LSP. The primary LSP may comprise the primary ingress node 306A, the backup ingress node 306B, the internal nodes 306D and 306G, and the egress node 306L. The primary LSP is shown using solid arrow lines in FIG. 3. The label switched system 300 may further comprise one or more backup LSPs configured to protect the primary ingress node 306A of the primary LSP and to forward data traffic from the source node 304 to the client node 308 when the primary ingress node 306A of the primary LSP fails. A backup LSP may comprise one or more P2P LSPs and/or P2MP LSPs. The backup LSP may comprise the backup ingress node 306B and one or more next-hop nodes for the primary ingress node 306A. For example, the backup LSP may comprise the backup ingress node 306B, and the internal node 306D.

In one example embodiment, the source node 304 may be configured to simultaneously communicate data traffic to the primary ingress node 306A and the backup ingress node 306B. In another example embodiment, the source node 304 may be configured to send data traffic to the primary ingress node 306A during typical operation and may switch data traffic from the primary ingress node 306A to the backup ingress node 306B when a primary ingress node 306A failure is detected. The primary ingress node 306A may be configured as a primary ingress node for an LSP (e.g., a primary LSP). The primary ingress node 306A may be configured to communicate data traffic from the source node 304 to the client node 308 using one or more LSPs. The primary ingress node 306A may also be configured to communicate with the backup ingress node 306B to signal a backup LSP. The primary ingress node 306A may be configured to communicate an ingress protection message object (e.g., a message object as described in FIG. 7) to the backup ingress node 306B to establish one or more backup LSPs.

In one example embodiment, the backup ingress node 306B may be predetermined by a network operator. Alternatively, the backup ingress node 306B may be configured to be selected automatically (e.g., using a path computation element (PCE)) based on network topology information. For example, a PCE may be configured to inform other network nodes of the selected backup ingress node 306B. In FIG. 3, the backup ingress node 306B may be a next-hop node of the primary ingress node 306A and may be a member of the primary LSP. The backup ingress node 306B may be configured to establish one or more backup LSPs to one or more next-hops nodes of the primary ingress node 306A and to deliver data traffic to the client node 308 when the primary ingress node 306A fails.

In response to receiving a message object from the primary ingress node 306A, the backup ingress node 306B may be configured to generate one or more forwarding entries for a primary LSP and/or one or more forwarding entries for a backup LSP in a forwarding table. The forwarding table may be stored and maintained within the backup ingress node 306B. The backup ingress node 306B may be configured to receive data traffic from the source node 304 and to communicate the data traffic to one or more network nodes (e.g., next-hop nodes of the primary ingress node 306A) along one or more primary LSPs using one or more backup LSPs. In one example embodiment, the backup ingress node 306B may be configured to drop data traffic from the source node 304 when a failure has not been detected on the primary ingress node 306A.

Table 1 is an example embodiment of a forwarding table comprising a forwarding entry for a primary LSP and a forwarding entry for a backup LSP. The forwarding table may be configured to maintain a plurality of incoming labels, a plurality of outgoing labels, a plurality of interface to next-hop identifiers, a status identifier, any other suitable routing information as would be appreciated by one of ordinary skill in the art upon viewing this disclosure, or combinations thereof. The incoming labels may indicate the sender of a data packet. A Forwarding Equivalent Class (FEC) may indicate the traffic is from a source node (e.g., source node 140 as described in FIG. 1) to be sent by the LSP. The outgoing labels may be allocated by a next-hop network node and may indicate a next-hop for a data packet. The interface to next-hop identifiers may identify an interface (e.g., a port) associated with the next-hop corresponding to an outgoing label. The status identifier may indicate if a forwarding entry is in an active state or in an inactive state. An active state may indicate that the forwarding entry may be used to forward data traffic. An inactive state may indicate that the forwarding entry may not be used to forward data traffic.

TABLE 1

*An example embodiment of a forwarding table*

| In Label/FEC | Out Label | Interface to Next-Hop | Status |
| --- | --- | --- | --- |
| L1 | L2 | to Node 306D | Active |
| FEC1 | L2 | to Node 306D | Inactive |

The label switched network 302 may be configured to employ a P2P LSP to communicate data traffic from the source node 304 to the client node 308. The backup ingress node 306B may be a next-hop node of the primary ingress node 306A along the primary LSP. In one example embodiment, the backup ingress node 306B may typically be configured to receive data traffic from a first source path from the primary ingress node 306A with an incoming label L1 and send the data traffic using the forwarding entry for the primary LSP. The backup ingress node 306B may send the data traffic to the next-hop using an outgoing label L2 via the interface to the next-hop corresponding to the outgoing label. When the source node 304 and/or the backup ingress node 306B detects a failure of the primary ingress node 306A, the status of the forwarding entry for the primary LSP may switch from active to inactive and the status of the forwarding entry for the backup LSP may switch from inactive to active. In one example embodiment, the status of the forwarding entry for the primary LSP and the status of the forwarding entry for the backup LSP may switch about simultaneously. Following the detection of a failure of the primary ingress node 306A, the backup ingress node 306B may be configured to receive data from a second source path from the source node 304 and to send the data traffic to internal node 306D using the forwarding entry for the backup LSP.

The label switched system 300 may comprise one or more failure detection links. Failure detection links used by the label switched system 300 may include a bidirectional fault detection (BFD) session, a P2P LSP, and/or any other suitable failure detection link. The failure detection link may comprise a link between two network nodes or a multi-hop link between a plurality of network nodes. In an example embodiment, the failure detection link may comprise a BFD session 350 between the primary ingress node 306A and the backup ingress node 306B, a BFD session 352 between the source node 304 and the primary ingress node 306A, and/or a BFD session 354 between the source node 304 and the backup ingress node 306B via the primary ingress node 306A.

The backup ingress node 306B may be configured to detect a failure involving the primary ingress node 306A using one or more of the failure detection links (e.g., BFD session 350 and/or BFD session 354). As such, the backup ingress node 306B may be configured in a source-backup detector mode (e.g., fault detection is performed in conjunction with the source node 304) or a backup detector mode (e.g., fault detection is performed by the backup ingress node 306B). When the backup ingress node 306B detects a failure in the primary ingress node 306A, the backup ingress node 306B may be configured to receive the data traffic intended for the primary LSP from the source node 304. After receiving the data traffic, the backup ingress node 306B may import the data traffic into the backup LSP and/or into the next-hop nodes of the primary ingress node 306A, such that the data traffic is merged into the primary LSP. In an example embodiment, the backup ingress node 306B may detect a failure of the connection between the backup ingress node 306B and the primary ingress node 306A by determining that BFD session 350 is down (e.g., not operating). In another example embodiment where the failure detection link uses both the BFD session 350 and the BFD session 354, the backup ingress node 306B may be configured to detect a failure of the connection between the primary ingress node 306A and the source node 304 by determining the BFD session 354 is down and that the BFD session 350 is up (e.g., operating). Additionally, the backup ingress node 306B may be configured to detect a failure in the primary ingress node 306A by determining that BFD session 354 and BFD session 350 are both down. In response to detecting a failure of the connection between the primary ingress node 306A and the source node 304 or detecting a failure in the primary ingress node 306A, the backup ingress node 306B may be configured to receive the data traffic for the primary LSP from the source node 304 and to import the data traffic into a backup LSP and/or the next-hop nodes of the primary ingress node 306A such that the data traffic is merged into the primary LSP.

The source node 304 may be configured to detect a failure involving the primary ingress node 306A using one or more of the failure detection links (e.g., BFD session 352 and/or BFD session 354). As such, the source node 304 may be configured in a source detector mode (e.g., fault detection is performed by the source node) or a source-backup detector mode. The source node 304 may be configured to detect a failure involving the primary ingress node 306A by determining that the BFD session 352 is down. In response to detecting a failure involving the primary ingress node 306A, the source node 304 may be configured to send the traffic intended for the primary LSP to the backup ingress node 306B and to stop sending traffic to the primary ingress node 306A. As such, the source node 304 switches traffic flow from the primary ingress node 306A to the backup ingress node 306B when the BFD session 352 is down.

Figure 4:
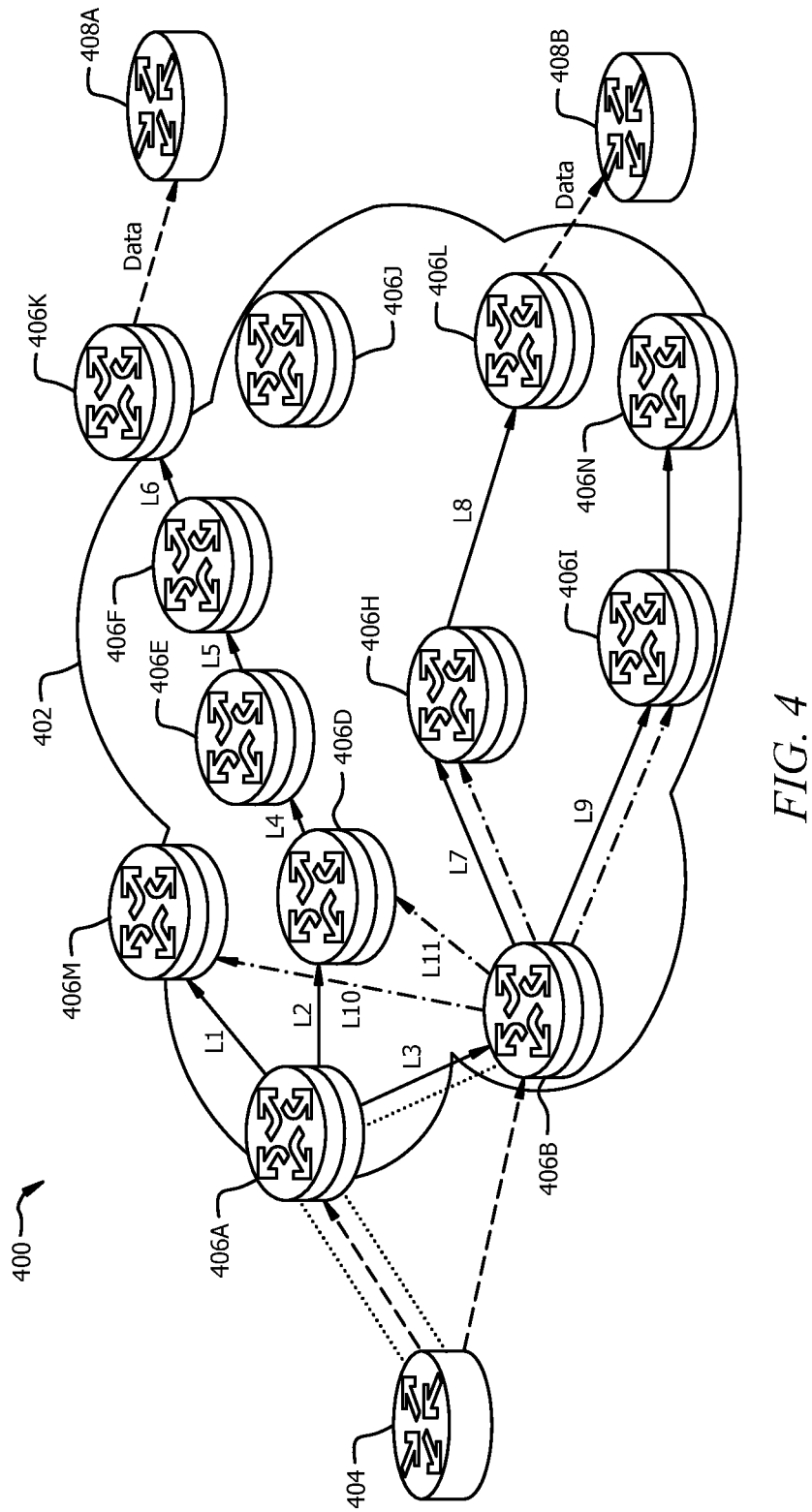
FIG. 4 is a schematic diagram of another example embodiment of a label switched system employing ingress node protection.

FIG. 4 is a schematic diagram of another example embodiment of a label switched system 400 employing ingress node protection. The label switched system 400 comprises a label switched network 402 comprising a plurality of network nodes 406A-406N. In particular, a primary ingress node 406A, a backup ingress node 406B, a plurality of internal nodes 406C-406J, and egress nodes 406K-406N. The primary ingress node 406A may be substantially similar to the first ingress node 111 described in FIG. 1, the backup ingress node 406B may be substantially similar to the second ingress node 112 described in FIG. 1, the plurality of internal nodes 406C-406J may be substantially similar to the internal nodes 130 described in FIG. 1, and the egress nodes 406K-406N may be substantially similar to the first egress node 121 or the second egress node 122 described in FIG. 1.

The label switched network 402 may be configured to employ one or more LSPs to communicate data traffic from the source node 404 to the client nodes 408A and 408B and/or to other client nodes connected to the egress nodes 406M and 406N (not shown in FIG. 4). The one or more LSPs may be as described in FIG. 1. In FIG. 4, label switched network 402 may be configured to employ a P2MP primary LSP that comprises a first primary sub LSP, a second primary sub LSP, a third primary sub LSP, and a fourth sub LSP. The first primary sub LSP may comprise the primary ingress node 406A, internal nodes 406D-406F, and egress node 406K. The second primary sub LSP may comprise the primary ingress node 406A, the backup ingress node 406B, internal node 406H, and egress node 406L. The third primary sub LSP may comprise the primary ingress node 406A and egress node 406M. The fourth primary sub LSP may comprise the primary ingress node 406A, the backup ingress node 406B, internal node 406I, and egress node 406N. The primary sub LSPs are shown using solid arrow lines in FIG. 4. The label switched network 402 further comprises one or more backup LSPs configured to protect the primary ingress node 406A of the primary LSPs and to forward data traffic from the source node 404 to the client nodes 408A and 408B and/or other client nodes (not shown in FIG. 4) when the primary ingress node 406A of the primary LSPs fails. The backup LSPs may comprise the backup ingress node 406B, the next-hop nodes of the backup ingress node 406B, and one or more next-hop nodes for the primary ingress node 406A other than the backup ingress node 406B.

The source node 404, the primary ingress node 406A, and/or the backup ingress node 406B may be configured substantially similar to the source node 304, the primary ingress node 306A, and the backup ingress node 306B as described in FIG. 3, respectively. The label switched system 400 may comprise one or more BFD sessions to detect a primary ingress node failure as described in FIG. 3. The backup ingress node 406B may be configured to create a backup LSP and/or to generate one or more forwarding entries for a primary LSP and/or one or more forwarding entries for a backup LSP in a forwarding table in response to receiving a message object (e.g., a message object as described in FIG. 7) from the primary ingress node 406A. The backup LSP may be from the backup ingress node 406B to a first set of nodes and a second set of nodes. The first set of nodes may comprise the next-hop nodes (e.g., nodes 406H and 406I) of the backup ingress node 406B. The second set of nodes may comprise the next-hop nodes (e.g., nodes 406M and 406D) of the primary ingress node 406A other than the backup ingress node 406B. In one example embodiment, the sub LSPs from the backup ingress node 406B to the first set of nodes may not be signaled and the forwarding entries for the sub LSPs may be created using the information of the primary LSP when creating the backup LSP. For example, one or more labels may be allocated by the nodes for the primary LSP. The sub LSPs from the backup ingress node 406B to the second set of nodes may be signaled and the forwarding entries for the sub LSPs may be created based on the signaling. Table 2 is an example embodiment of a forwarding table comprising a plurality of forwarding entries for a primary LSP and a plurality of forwarding entries for a backup LSP. The plurality of forwarding entries for the backup LSP may comprise one or more forwarding entries for the next-hop nodes of the backup ingress node 406B and/or one or more forwarding entries for the next-hop nodes of the primary ingress node 406A. The forwarding table may be configured substantially similar to the forwarding table as described in FIG. 3.

TABLE 2

An example embodiment of a forwarding table

| In Label/FEC | Out Label | Interface to Next-Hop | Status |
|---|---|---|---|
| L3 | L7 | to Node 406H | Active |
|  | L9 | to Node 406I |  |
| FEC1 | L7 | to Node 406H | Inactive |
|  | L9 | to Node 406I |  |
| FEC1 | L10 | to Node 406M | Inactive |
|  | L11 | to Node 406D |  |

The label switched network 402 may be configured to employ a P2MP LSP to communicate data traffic from the source node 404 to the client nodes 408A and 408B and/or other client nodes (not shown in FIG. 4). The backup ingress node 406B may be a next-hop node of the primary ingress node 406A along the primary LSP. In typical operation, the backup ingress node 406B may be configured to receive data traffic from a first source path from the primary ingress node 406A with an incoming label L3 and to send the data traffic using the forwarding entries for the primary LSP (e.g., P2MP LSP). The backup ingress node 406B may send the data traffic to one or more next-hops with outgoing labels associated with the next-hop nodes. The backup ingress node 406B may send data traffic to internal node 406H using an outgoing label L7 and internal node 406I using an outgoing label L9. Labels L7 and L9 may be labels allocated by nodes 406H and 406I for the primary LSP, respectively. When the source node 404 and/or the backup ingress node 406B detects a failure of the primary ingress node 406A, the status of the forwarding entries for the primary LSP may be switched from active to inactive and the status of the forwarding entries for the backup LSPs may switch from inactive to active. In one example embodiment, the status of the forwarding entry for the primary LSP and the status of the forwarding entry for the backup LSP may switch about simultaneously. Following the detection of a failure of the primary ingress node 406A, the backup ingress node 406B may be configured to receive data traffic from a second source path from the source node 404 and to send the data traffic using the forwarding entries for the backup LSPs. The backup ingress node 406B may be configured to send data traffic from the source node 404 to nodes 406H, 406I, 406M, and 406D. Labels L1-L9 may be labels associated with and/or assigned to data traffic flow between adjacent (e.g., next-hop) network nodes. For instance, label L3 may be a label associated with data traffic flow from the primary ingress node 406A to the backup ingress node 406B and may be allocated by the backup ingress node 406B.

Figure 5:
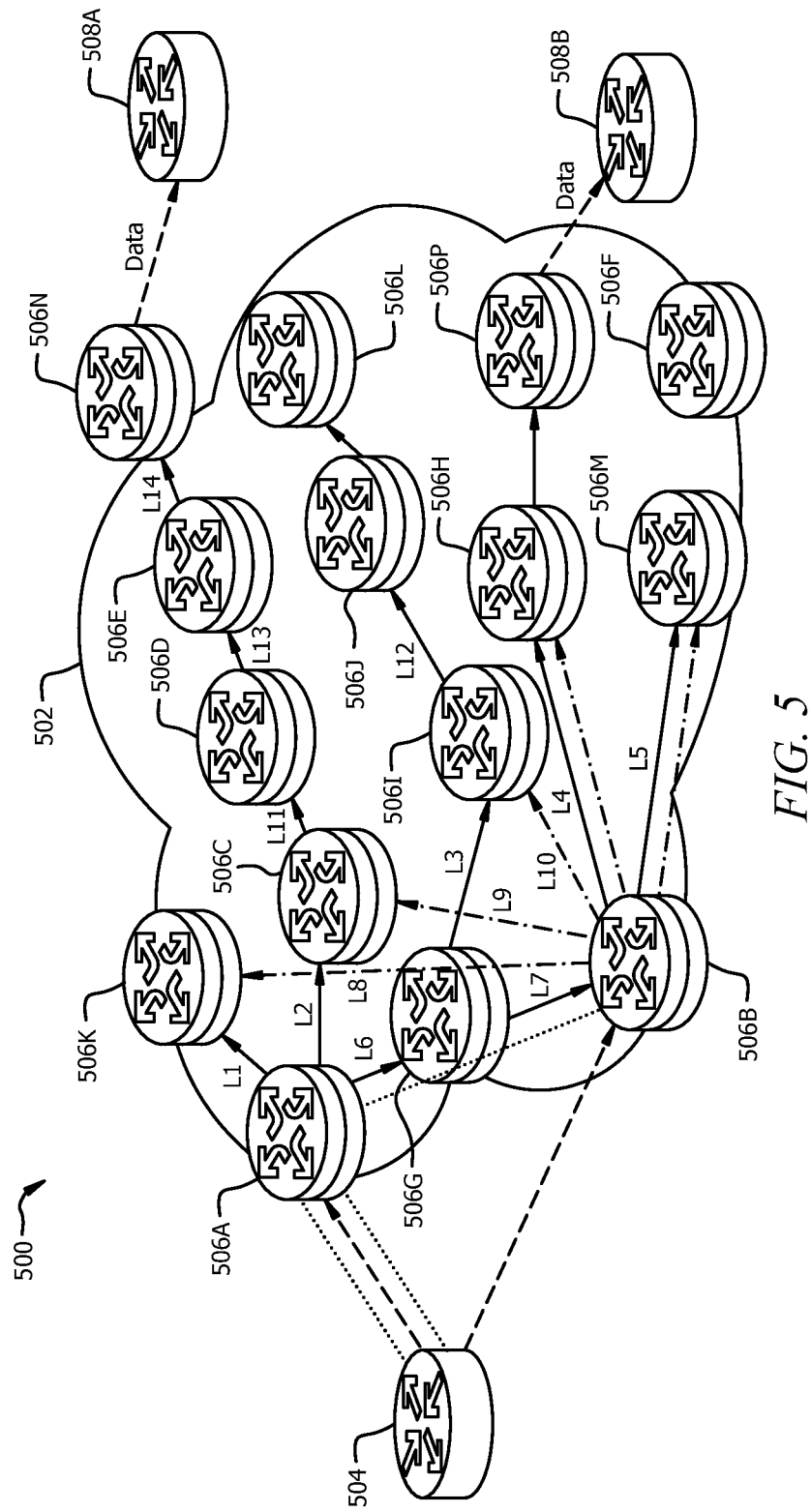
FIG. 5 is a schematic diagram of another example embodiment of a label switched system employing ingress node protection.

FIG. 5 is a schematic diagram of another example embodiment of a label switched system 500 employing ingress node protection. The label switched system 500 comprises a label switched network 502 comprising a plurality of network nodes 506A-506N and 506P. In particular, a primary ingress node 506A, a backup ingress node 506B, a plurality of internal nodes 506C-506J, and egress nodes 506K-506N and 506P. The primary ingress node 506A may be substantially similar to the first ingress node 111 described in FIG. 1, the backup ingress node 506B may be substantially similar to the second ingress node 112 described in FIG. 1, the plurality of internal nodes 506C-506J may be substantially similar to the internal nodes 130 described in FIG. 1, and the egress nodes 506K-506N and 506P may be substantially similar to the first egress node 121 or the second egress node 122 described in FIG. 1.

The label switched network 502 may be configured to employ one or more LSPs to communicate data traffic from the source node 504 to the client node 508A and 508B and/or other client nodes (not shown in FIG. 5). The one or more LSPs may be as described in FIG. 1. A primary LSP from the primary ingress node 506A to the egress nodes 506K-506N and 506P is shown using solid arrow lines in FIG. 5. The label switched network 502 further comprises one or more backup LSPs configured to protect the primary ingress node 506A and to forward data traffic from the source node 504 to the client nodes 508A and 508B and/or other client nodes (not shown in FIG. 5) when the primary ingress node 506A of the primary LSP fails. The backup LSPs may be from the backup ingress node 506B to the next-hop nodes of the backup ingress node 506B and the next-hop nodes of each previous hop node (e.g., the primary ingress node 506A and node 506G) of the backup ingress node 506B other than a node from the primary ingress node 506A to the backup ingress node 506B along the primary LSP.

The source node 504, the primary ingress node 506A, and/or the backup ingress node 506B may be configured substantially similar to the source node 304, the primary ingress node 306A, and the backup ingress node 306B as described in FIG. 3, respectively. The label switched system 500 may comprise one or more BFD sessions to detect a primary ingress node failure as described in FIG. 3. The backup ingress node 506B may be configured to create one or more backup LSPs and/or to generate one or more forwarding entries for a primary LSP and/or one or more forwarding entries for the backup LSPs in a forwarding table in response to receiving a message object (e.g., a message object as described in FIG. 7) from the primary ingress node 506A. In an example embodiment, a backup LSP may be created from the backup ingress node 506B to a first set of nodes and a second set of nodes. The first set of nodes may comprise the next-hop nodes (e.g., nodes 506H and 506M) of the backup ingress node 506B. The second set of nodes may comprise the next-hop nodes (e.g., node 506K and 506C) of the primary ingress node 506A other than the previous hop node of the backup ingress node 506B (e.g., node 506G) and the next-hop node of the previous hop node of the backup ingress node 506B (e.g., node 506I). In an example embodiment, the sub LSPs from the backup ingress node 506B to the first set of nodes may not be signaled and the forwarding entries for the sub LSPs may be created using the information of the primary LSP when creating the backup LSP. For example, one or more labels may be allocated by the nodes for the primary LSP. The sub LSPs from the backup ingress node 506B to the second set of nodes may be signaled and the forwarding entries for the sub LSPs may be created based on the signaling. Table 3 is an example embodiment of a forwarding table comprising a plurality of forwarding entries for a primary LSP and a plurality of forwarding entries for a backup LSP. The plurality of forwarding entries for the backup LSP may comprise one or more forwarding entries for the next-hop nodes of the backup ingress node 506B and/or one or more forwarding entries for the next-hop nodes of each previous hop node (e.g., the primary ingress node 506A and node 506G) of the backup ingress node 506B other than a node from the primary ingress node 506A to the backup ingress node 506B (e.g., nodes 506G and 506B) along the primary LSP. The forwarding table may be configured substantially similar to the forwarding table described in FIG. 3.

TABLE 3

An example embodiment of a forwarding table

| In Label/FEC | Out Label | Interface to Next-Hop | Status |
|---|---|---|---|
| L7 | L4 | to Node 506H | Active |
|  | L5 | to Node 506M |  |
| FEC1 | L4 | to Node 506H | Inactive |
|  | L5 | to Node 506M |  |
| FEC1 | L8 | to Node 506K | Inactive |
|  | L9 | to Node 506C |  |
|  | L10 | to Node 506I |  |

The label switched network 502 may be configured to employ a P2MP LSP to communicate data traffic from the source node 504 to the client nodes 508A and 508B and/or other client nodes (not shown in FIG. 5). The backup ingress node 506B may be along the primary LSP, but may not be a direct next-hop of the primary ingress node 506A. In typical operation, the backup ingress node 506B may be configured to receive data traffic from a first source path from the primary ingress node 506A via internal node 506G with an incoming label L7 and to send the data traffic using the forwarding entries for the primary LSP. The backup ingress node 506B may send the data traffic to one or more next-hop nodes with outgoing labels associated with the next-hop nodes. The backup ingress node 506B may be configured to send data traffic to internal nodes 506H using an outgoing label L4 and egress node 506M using an outgoing label L5. When the source node 504 and/or the backup ingress node 506B detects a failure of the primary ingress node 506A, the status of the forwarding entries for the primary LSP may switch from active to inactive and the status of the forwarding entries for the backup LSP may switch from inactive to active. In one example embodiment, the status of the forwarding entry for the primary LSP and the status of the forwarding entry for the backup LSP may switch substantially simultaneously. Following the detection of a failure of the primary ingress node 506A, the backup ingress node 506B may be configured to receive data traffic from a second source path from the source node 504 and to send the data traffic using the forwarding entries for the backup LSPs. The backup ingress node 506B may be configured to send data traffic from the source node 504 to nodes 506K, 506C, 506I, 506H, and 506M.

Figure 6:
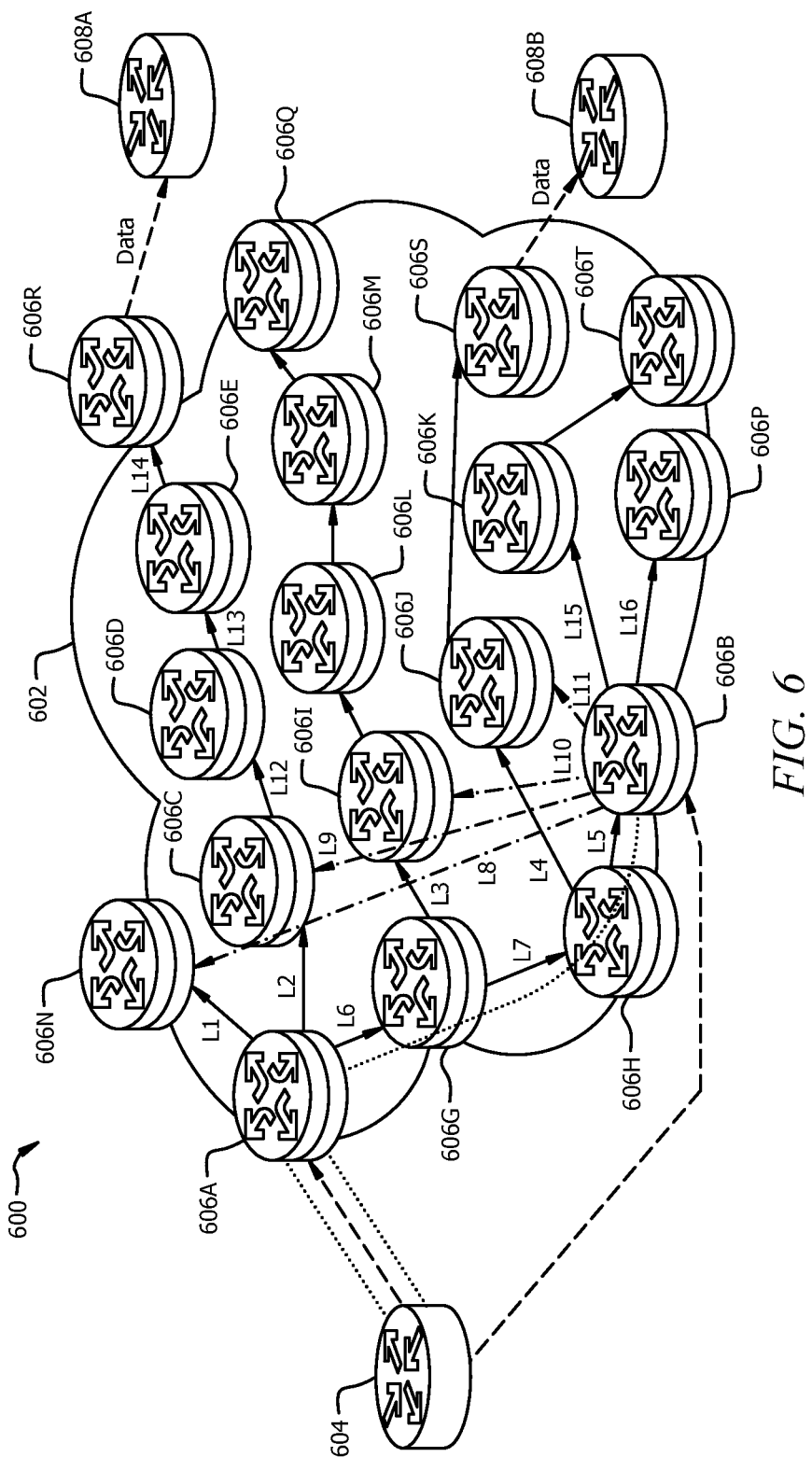
FIG. 6 is a schematic diagram of another example embodiment of a label switched system employing ingress node protection.

FIG. 6 is a schematic diagram of another example embodiment of a label switched system 600 employing ingress node protection. The label switched system 600 comprises a label switched network 602 comprising a plurality of network nodes 606A-606M and 606N-606T. In particular, a primary ingress node 606A, a backup ingress node 606B, a plurality of internal nodes 606C-606M, and egress nodes 606N-606T. The primary ingress node 606A may be substantially similar to the first ingress node 111 described in FIG. 1, the backup ingress node 606B may be substantially similar to the second ingress node 112 described in FIG. 1, the plurality of internal nodes 606C-606M may be substantially similar to the internal nodes 130 described in FIG. 1, and the egress nodes 606N-606T may be substantially similar to the first egress node 121 or the second egress node 122 described in FIG. 1.

The label switched network 602 may be configured to employ one or more LSPs to communicate data traffic from the source node 604 to the client node 608A and 608B and/or other client nodes (not shown in FIG. 6). The one or more LSPs may be as described in FIG. 1. A primary LSP from the primary ingress node 606A is shown using solid arrow lines in FIG. 6. The label switched network 602 further comprises one or more backup LSPs configured to protect the primary ingress node 606A and to forward data traffic from the source node 604 to client nodes 608A and 608B and/or other client nodes (not shown in FIG. 6) when the primary ingress node 606A of the primary LSP fails. The backup LSPs may comprise the backup ingress node 606B, the next-hop nodes of the backup ingress node 606B and the next-hop nodes of the previous hop node (e.g., the primary ingress node 606A and nodes 606G and 606H) of the backup ingress node 606B other than a node from the primary ingress node 606A to the backup ingress node 606B along the primary LSP.

The source node 604, the primary ingress node 606A, and/or the backup ingress node 606B may be configured substantially similar to the source node 304, the primary ingress node 306A, and the backup ingress node 306B as described in FIG. 3, respectively. The label switched system 600 may comprise one or more BFD sessions to detect a primary ingress node failure as described in FIG. 3. The backup ingress node 606B may be configured to create one or more backup LSPs and/or to generate one or more forwarding entries for a primary LSP and/or one or more forwarding entries for the backup LSPs in a forwarding table in response to receiving a message object (e.g., a message object as described in FIG. 7) from the primary ingress node 606A. In an example embodiment, a backup LSP may be created from the backup ingress node 606B to a first set of nodes and a second set of nodes. The first set of nodes may comprise the next-hop nodes (e.g., node 606K and 606P) of the backup ingress node 606B. The second set of nodes may comprise the next-hop nodes of the nodes from the primary ingress node 606A to the backup ingress node 606B excluding the backup ingress node 606B along the primary LSP other than the nodes from the primary ingress node 606A to the backup ingress node 606B along the primary LSP. The second set of nodes may comprise the next-hop nodes (e.g., nodes 606N and 606C) of the primary ingress node 606A other than node 606G, the next-hop nodes (e.g., node 606I) of the node 606G other than node 606H, and the next-hop nodes (e.g., node 606J) of the node 606H other than the backup ingress node 606B. In one example embodiment, the sub LSPs from the backup ingress node 606B to the first set of nodes may not be signaled and the forwarding entries for the sub LSPs may be created using the information of the primary LSP. For example, one or more labels may be allocated by the nodes for the primary LSP. The sub LSPs from the backup ingress node 606B to the second set of nodes may be signaled and the forwarding entries for the sub LSPs may be created based on the signaling. Table 4 is an example embodiment of a forwarding table comprising a plurality of forwarding entries for a primary LSP and a plurality of forwarding entries for a backup LSP. The plurality of forwarding entries for the backup LSP may comprise one or more forwarding entries for the next-hop nodes of the backup ingress node 606B and/or one or more forwarding entries for the second set of nodes. The forwarding table may be configured substantially similar to the forwarding table described in FIG. 3.

TABLE 4

An example embodiment of a forwarding table

| In Label/FEC | Out Label | Interface to Next-Hop | Status |
| --- | --- | --- | --- |
| L5 | L15 | to Node 606K | Active |
|  | L16 | to Node 606P |  |
| FEC1 | L15 | to Node 606K | Inactive |
|  | L16 | to Node 606P |  |
| FEC1 | L8 | to Node 606N | Inactive |
|  | L9 | to Node 606C |  |
|  | L10 | to Node 606I |  |
|  | L11 | to Node 606J |  |

The label switched network 602 may be configured to employ a P2MP LSP to communicate data traffic from the source node 604 to the client nodes 608A and 608B and/or other client nodes (not shown in FIG. 6). The backup ingress node 606B may be along the primary LSP, but may be more than one hop away from the primary ingress node 606A (e.g., three hops away). In typical operation, the backup ingress node 606B may be configured to receive data traffic from a first source path from the primary ingress node 606A via internal nodes 606G and 606H and to send the data traffic using the forwarding entries for the primary LSP. The backup ingress node 606B may send the data traffic to one or more next-hop nodes with outgoing labels associated with the next-hop nodes. The backup ingress node 606B may be configured to send data traffic to node 606K using an outgoing label L15 and to node 606P using an outgoing label L16. When the source node 604 and/or the backup ingress node 606B detects a failure of the primary ingress node 606A, the status of the forwarding entries for the primary LSP may switch from active to inactive and the status of the forwarding entries for the backup LSP may switch from inactive to active. In one example embodiment, the status of the forwarding entries for the primary LSP and the status of the forwarding entries for the back LSP may switch substantially simultaneously. Following the detection of a failure of the primary ingress node 606A, the backup ingress node 606B may be configured to receive data traffic from a second source path from the source node 604 and to send the data traffic using the forwarding entries for the backup LSPs. The backup ingress node 606B may be configured to send data traffic from the source node 604 to the next-hop nodes of the backup ingress node 606B (e.g., nodes 606K and 606P), the next-hop nodes of the primary ingress node 606A other than node 606G (e.g., nodes 606N and 606C), which are along the primary LSP from the primary ingress node 606A to the backup ingress node 606B, the next-hop node of node 606G other than node 606H (e.g., node 606I), which is along the primary LSP from the primary ingress node 606A to the backup ingress node 606B, and the next-hop node of the node 606H other than node 606B (e.g., node 606J), which is along the primary LSP from the primary ingress node 606A to the backup ingress node 606B.

Figure 7:
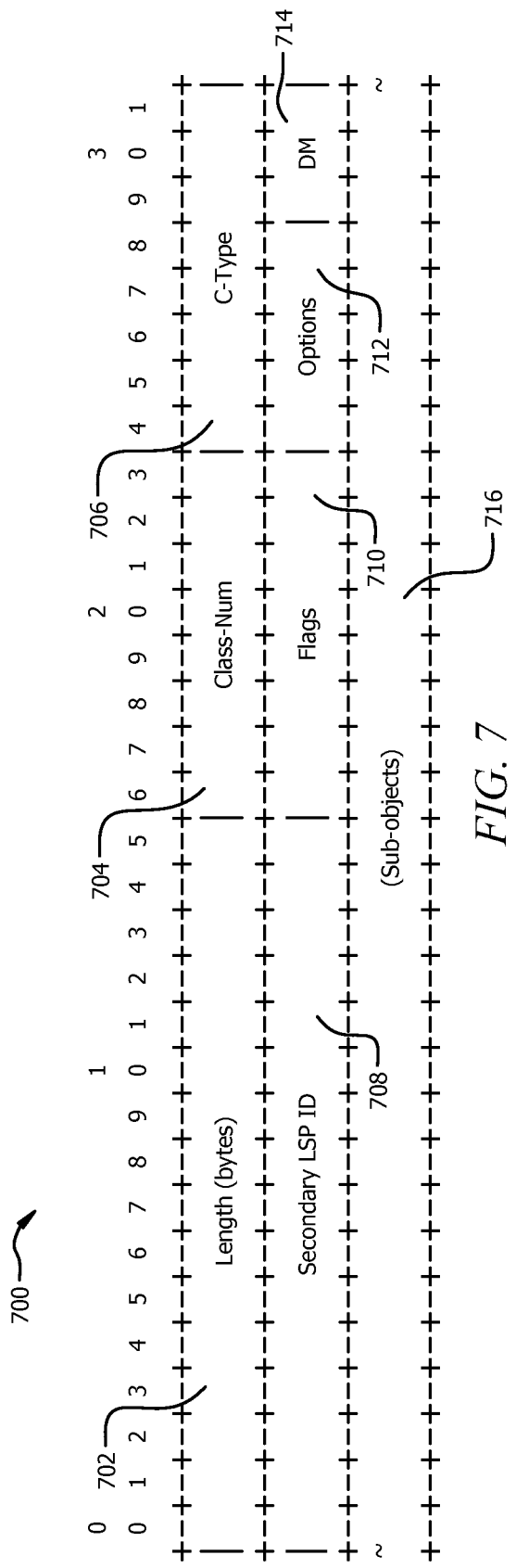
FIG. 7 is an example embodiment of a message object.

FIG. 7 is an example embodiment of a message object 700 which may be employed to signal ingress fault detection and/or to provide control information to a backup ingress node to provide ingress fault detection. In one embodiment, a primary ingress node (e.g., primary ingress node 306A as described in FIG. 3) of a primary LSP may transmit a message object 700 to a backup ingress node (e.g., backup ingress node 306B as described in FIG. 3). Message object 700 may also be referred to as an ingress protection object. Message object 700 may be configured to be an independent message or incorporated within another message. For example, message object 700 may be an ingress protection object and may be inserted into a PATH message being communicated between a primary ingress node and a backup ingress node.

Message object 700 comprises a length field 702, a class number field 704, a class type (c-type) field 706, a secondary LSP identifier (ID) 708, a flag field 710, an options field 712, a detection mode (DM) field 714, and a sub-objects field 716. The length field 702 may be about two bytes long and may indicate the total length (e.g., in bytes) of the message object 700. The class number field 704 may be about one byte long and may identify a message object. The class type field 706 may be about one byte long and may identify a message object type. The secondary LSP ID field 708 may be about two bytes long and may comprise an ID, which may be used by a backup ingress node to set up a backup LSP such that resources may be shared between the backup LSP and an existing LSP. The flag field 710 may be about one byte long and may communicate status information from the backup ingress to the primary ingress. For example, the flag field 710 may indicate whether ingress fault protection is available or in use. The options field 712 may be about five bits long and may indicate a desired behavior to a backup ingress node and/or a next-hop node. For example, the option field 712 may indicate to use a P2MP backup LSP to protect the primary ingress node. The detection mode field 714 may be about three bits long and may indicate a desired failure detection mode. For example, the detection mode field 714 may indicate that a backup ingress node and/or a source node may be responsible for detecting an ingress node failure and/or for redirecting data traffic. The sub-objects field 716 may comprise one or more sub-objects which may comprise information for establishing a backup LSP and/or for controlling a backup LSP, as will be disclosed herein. In an example embodiment, the sub-objects field 716 may be about eight bytes long.

Figure 8:
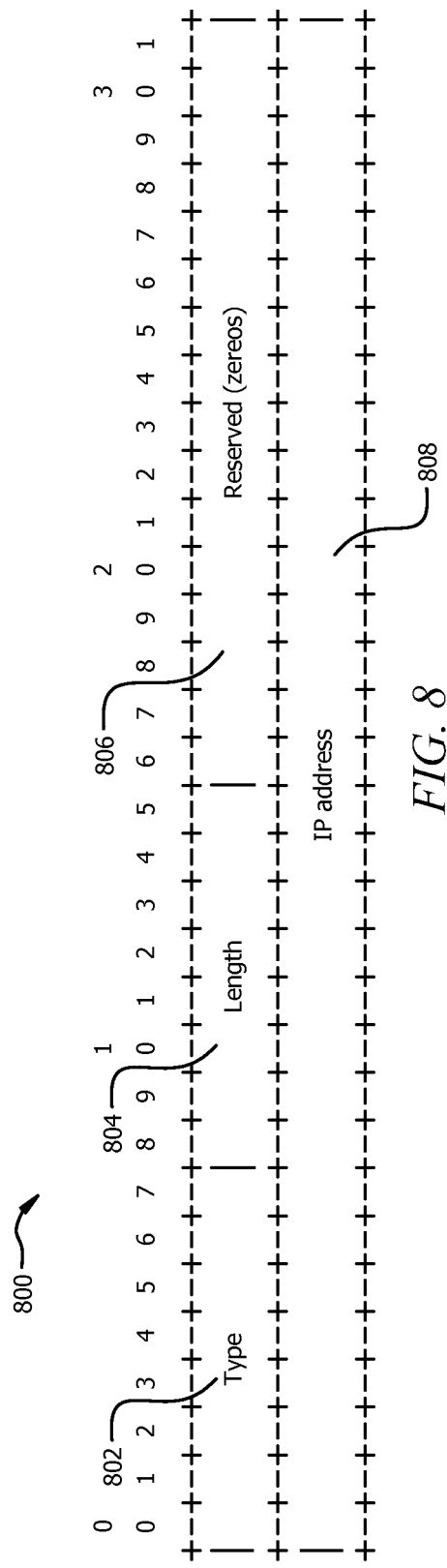
FIG. 8 is an example embodiment of a message sub-object.

FIG. 8 is an example embodiment of a message sub-object 800 used to communicate a backup ingress node IP address or a primary ingress node IP address. In one embodiment, a primary ingress node (e.g., primary ingress node 306A as described in FIG. 3) of a primary LSP may transmit a message object (e.g., message object 700 as described in FIG. 7) that comprises sub-object 800 to a backup ingress node (e.g., backup ingress node 306B as described in FIG. 3). Sub-object 800 may comprise a type field 802, a length field 804, a reserved field 806, and an IP address field 808. The type field 802 may be about one byte long and may indicate that the sub-object 800 comprises a backup ingress node IP address or a primary ingress node IP address (e.g., an IP version 4 (IPv4) or IP version 6 (IPv6) address). The length field 804 may be about one byte long and may indicate the total length (e.g., in bytes) of sub-object 800. The reserved field 806 may be about two bytes long and may be filled with zeros. The IP address field 808 may be about four bytes long for an IPv4 address and about eight bytes long for an IPv6 address. The IP address field 808 may indicate the IP address of the backup ingress node or the primary ingress node. For example, the IP address field 808 may comprise a 32-bit unicast IPv4 address or a 128-bit unicast IPv6 address.

Figure 9:
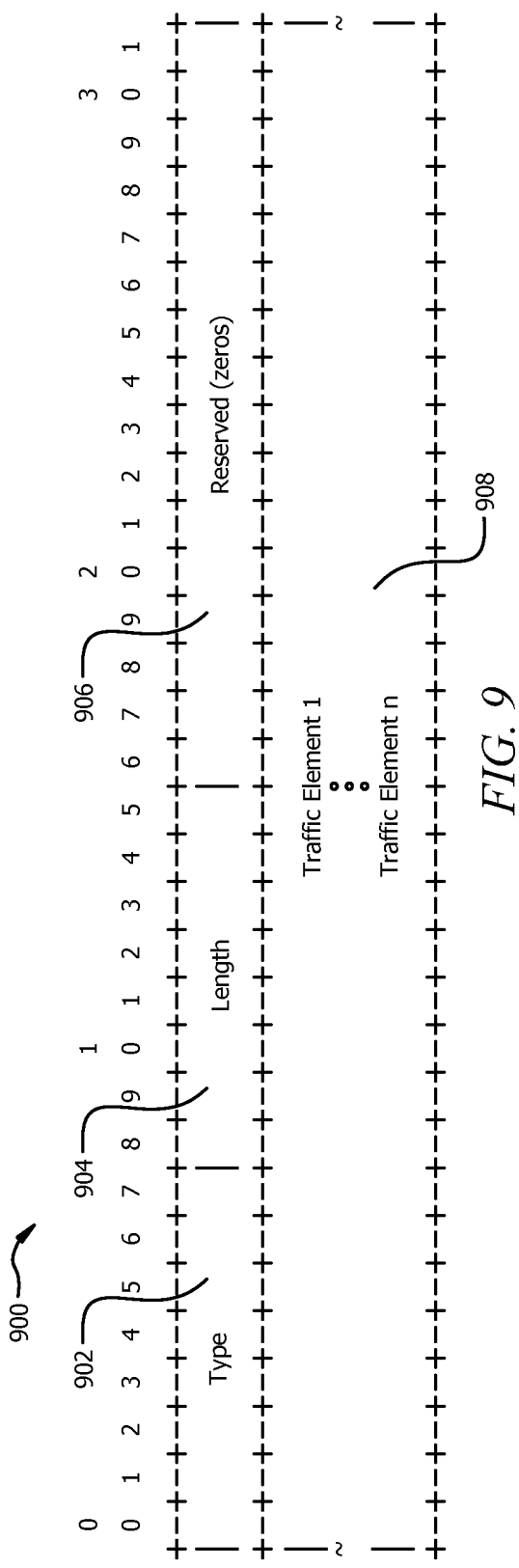
FIG. 9 is another example embodiment of a message sub-object.

FIG. 9 is another example embodiment of a message sub-object 900 employed to describe the data traffic to be mapped or routed to the backup LSP on the backup ingress node. In one embodiment, a primary ingress node (e.g., primary ingress node 306A as described in FIG. 3) of a primary LSP may transmit a message object (e.g., message object 700 as described in FIG. 7) that comprises sub-object 900 to a backup ingress node (e.g., backup ingress node 306B as described in FIG. 3). Sub-object 900 comprises a type field 902, a length field 904, a reserved field 906, and one or more traffic elements 908. The type field 902 may be about one byte long and may indicate that the sub-object 900 comprises one or more traffic elements. The length field 904 may be about one byte long and may indicate the total length (e.g., in bytes) of sub-object 900. The reserved field 906 may be about two bytes long and may be filled with zeros. Each traffic element 908 may be about four bytes long and may indicate a traffic type. For example, a traffic element 908 may indicate a traffic type as interface traffic and may comprise an index of an interface from which the traffic is imported into the backup LSP. Alternatively, the traffic element 908 may indicate a traffic type as IPv4/IPv6 prefix traffic and may comprise a prefix length and an IPv4/IPv6 address prefix.

Figure 10:
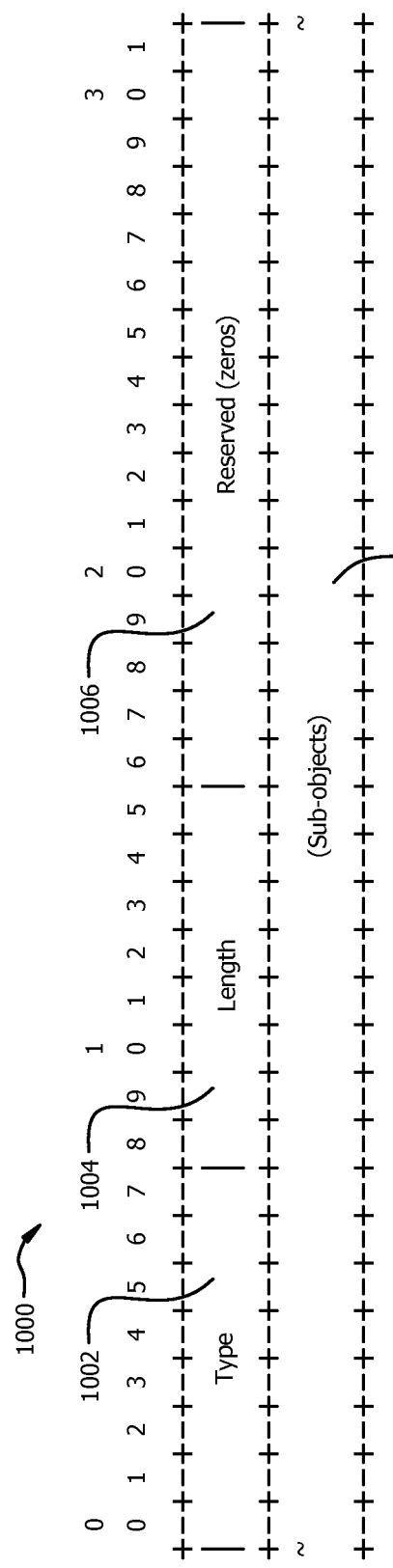
FIG. 10 is another example embodiment of a message sub-object.

FIG. 10 is another example embodiment of a message sub-object 1000 employed to communicate the labels and routes of the next-hops for a primary ingress node. Sub-object 1000 comprises a type field 1002, a length field 1004, a reserved field 1006, and a sub-object field 1008. The type field 1002 may be about one byte long and may indicate that the sub-object 1000 comprises one or more labels and/or routes for the next-hops for a primary ingress node. The length field 1004 may be about one byte long and may indicate the total length (e.g., in bytes) of sub-object 1000. The reserved field 1006 may be about two bytes long and may be filled with zeros. The sub-object field 1008 may comprise one or more labels and/or routes for the next-hops for a primary ingress node. For example, the sub-object field 1008 may be about eight bytes long and may comprise the first hops of an LSP and a label paired with each hop. With respect to FIGS. 7-10, it is noted that any data field may be any suitable size as would be appreciated by one of ordinary skill in the art upon viewing this disclosure.

Figure 11:
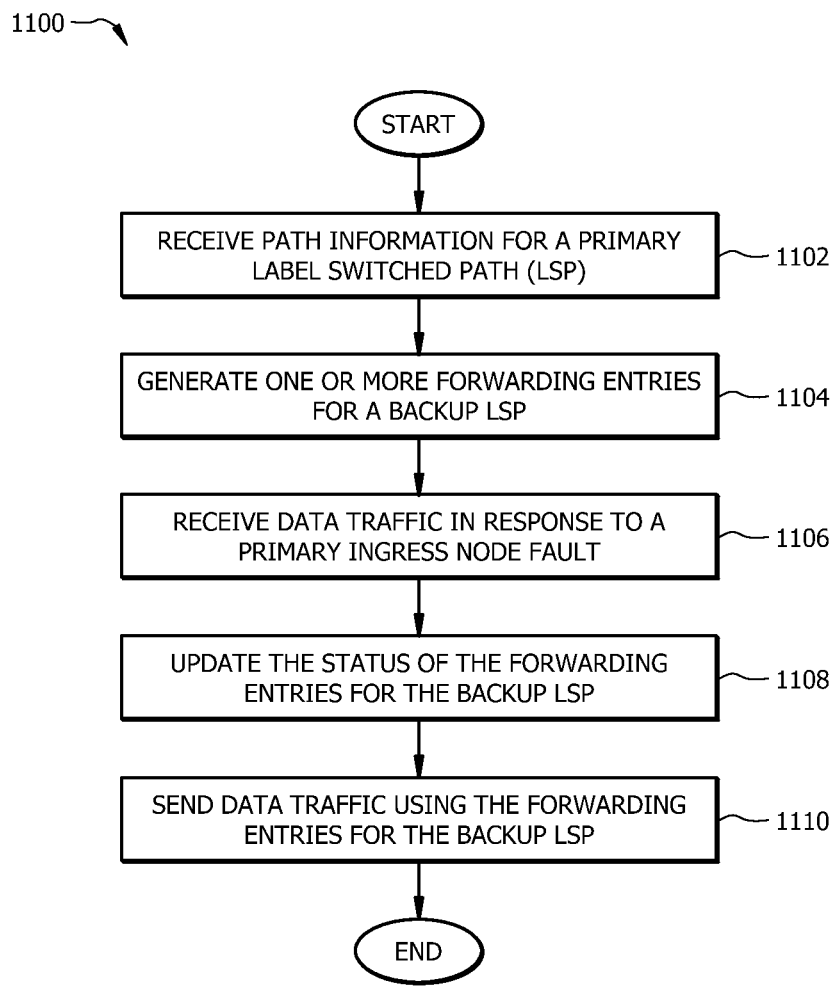
FIG. 11 is a flowchart of an example embodiment of an ingress node protection method.

FIG. 11 is a flowchart of an example embodiment of an ingress node protection method 1100. In an example embodiment, method 1100 may be implemented in a network node (e.g., a backup ingress node 306B as described in FIG. 3). Method 1100 may be employed to communicate data traffic from a source node to a client node via a backup LSP in the event a primary ingress node of the primary LSP fails. At step 1102, method 1100 may receive path information for a primary LSP. In one example embodiment, method 1100 may receive an ingress protection request message (e.g., a PATH message) that comprises an ingress protection object (e.g., message object 700 as described in FIG. 7) and/or path information. The path information may include, but is not limited to, routing information for one or more LSPs, identifiers for one or more network nodes along one or more LSPs, identifier for one or more routes, and labeling information. The ingress protection request message may also comprise an identifier (e.g., an IP address or a media access control (MAC) address) that indicates a backup ingress node for a primary ingress node and/or a fault detection mode.

At step 1104, method 1100 may generate one or more forwarding entries for a backup LSP in a forwarding table. A forwarding entry may comprise an incoming label, an outgoing label, an identifier for an interface to a next-hop node (e.g., a port assignment), and a status identifier. Method 1100 may use the path information to generate one or more one or more forwarding entries for the next-hop nodes of the backup ingress node, one or more forwarding entries for the next-hop nodes of the primary ingress node, and/or one or more forwarding entries for the next-hop nodes of network nodes along a path between the primary ingress node and the backup ingress node. In one example embodiment, a forwarding entry may not be generated for one or more network nodes along a path between the primary ingress node and the backup ingress node. Method 1100 may send a confirmation message to the primary ingress node in response to the ingress protection request message. The confirmation message may indicate that ingress protection for the primary ingress node is available. For example, the confirmation message may be an RESV message comprising an ingress protection object (e.g., message object 700 as described in FIG. 7) with one or more flags (e.g., flag field 710 as described in FIG. 7) configured to indicate that ingress local protection is available.

At step 1106, method 1100 may receive data traffic in response to a primary ingress node fault. A primary ingress node fault may be detected by the backup ingress node and/or the source node. For example, the primary ingress node fault may be detected as described in FIG. 3. In one example embodiment, method 1100 may receive data traffic from a source node (e.g., a source node 304 as described in FIG. 3) in response to primary ingress node fault. In another example embodiment, method 1100 may receive data traffic from the source node, but may drop the data traffic when a primary ingress node fault has not been detected. When a primary ingress node fault has been detected, method 1100 may not drop the data traffic from the source node. At step 1108, method 100 may update the status of the forwarding entries for the backup LSP. When a primary ingress node fault has been detected and/or the backup ingress node has received data traffic, the status of the forwarding entries for one or more primary LSPs and/or the status of the forwarding entries for one or more backup LSPs in the forwarding table may be updated. The status of the forwarding entries for one or more primary LSPs may switch from active to inactive and status of the forwarding entries for one or more backup LSPs may switch from inactive to active. In one example embodiment, the status of the forwarding entries for the primary LSP and the status of the forwarding entries for the back LSP may switch substantially simultaneously. At step 1110, method 1100 may send the data traffic using the forwarding entries for the backup LSP. Method 1100 may send the data traffic to one or more next-hop nodes of the backup ingress node, one or more next-hop nodes of the primary ingress node, and/or one or more next-hop nodes of network nodes along a path between the primary ingress node and the backup ingress node using the forwarding entries for the backup LSPs in the forwarding table.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. In a network node, a method for providing ingress fault protection in a label switched network, the method comprises:
   receiving path information that identifies one or more other network nodes along a primary label switched path (LSP);
   creating a backup LSP to the other network nodes;
   generating one or more forwarding entries along the backup LSP, wherein the forwarding entries along the backup LSP comprise a status identifier that indicates an active state when data traffic is being sent using the backup LSP and an inactive state when data traffic is not being sent using the backup LSP;
   communicating data traffic from a first source path to one or more of the other network nodes;
   receiving data traffic from a second source path in response to an ingress node failure of the first source path; and
   sending the data traffic from the second source path using the forwarding entries and the backup LSP,
   wherein the network node is a member of the primary LSP.

2. The method of claim 1, wherein the network node is a next-hop node of a primary ingress node for the primary LSP.

3. The method of claim 1, wherein the status identifier switches from the inactive state to the active state following the ingress node failure of the first source path.

4. The method of claim 1, wherein the forwarding entries comprise a forwarding equivalent class (FEC) that identifies a data traffic source and an outgoing label that identifies a next-hop node.

5. The method of claim 1, further comprising generating one or more forwarding entries along the primary LSP for the other network nodes.

6. The method of claim 5, wherein communicating the data traffic from the first source path comprises sending the data traffic to the other network nodes along the primary LSP.

7. The method of claim 1, further comprising detecting the ingress node failure of the first source path using one or more fault detection links.

8. The method of claim 1, further comprising dropping data traffic from the second source path when the ingress node failure of the first source path is not present.

9. The method of claim 1, wherein data traffic is unavailable from the second source path when the ingress node failure of the first source path is not present.

10. The method of claim 1, wherein creating the backup LSP comprises:
    creating a first forwarding entry for a first sub LSP to a next-hop node of the network node;
    signaling a second sub LSP to one or more of the other network nodes; and
    creating a second forwarding entry for the second sub LSP based on the signaling of the second sub LSP,
    wherein creating the first forwarding entry comprises using one or more labels for the primary LSP and without signaling the first sub LSP.

11. The method of claim 1, wherein the backup LSP is a point-to-point (P2P) LSP.

12. The method of claim 1, wherein the backup LSP is a point to multipoint (P2MP) LSP.

13. A computer program product comprising computer executable instructions stored on a non-transitory computer readable medium that when executed by a processor causes a network device to perform the following:

receive an ingress protection request message that identifies one or more network nodes along a primary label switched path (LSP);

creating a backup LSP;

generate a forwarding table that comprises one or more forwarding entries for the network nodes along the primary LSP and one or more forwarding entries for the backup LSP;

receive data traffic from a first source path within a label switched network;

send the data traffic from the first source path using the forwarding entries for the primary LSP;

receive data traffic from a second source path when an ingress node fault in the first source path is present; and send the data traffic from the second source path using the forwarding entries for the backup LSP, wherein the forwarding entries along the primary LSP and the forwarding entries along the backup LSP comprise a status identifier that indicates an active state when a forwarding entry is being used and an inactive state when a forwarding entry is not being used, and wherein the network device is along the primary LSP.

14. The computer program product of claim 13, wherein the computer executable instructions, when executed by the processor, cause the network device to detect the ingress node fault in the first source path using one or more fault detection links.

15. The computer program product of claim 13, wherein the ingress protection request message identifies the network device as a backup ingress node.

16. An apparatus comprising:

a receiver configured to receive an ingress protection message that identifies the apparatus as a backup ingress node and identifies one or more network nodes along a primary label switched path (LSP) and to receive data traffic;

a processor coupled to a memory device and the receiver, wherein the memory device comprises computer executable instructions stored in a non-transitory computer readable medium such that when executed by the processor causes the processor to:

create a backup LSP; and generate a forwarding table that comprises one or more forwarding entries for the network nodes along the primary LSP and one or more forwarding entries for the network nodes along the backup LSP, wherein the forwarding entries along the backup LSP comprise a status identifier that indicates an active state when data traffic is being transmitted using the backup LSP and an inactive state when data traffic is not being transmitted using the backup LSP; and a transmitter coupled to the processor, wherein the transmitter is configured to communicate the data traffic, and wherein the apparatus is a member of the primary LSP.

17. The apparatus of claim 16, wherein the computer executable instructions, when executed by the processor, cause the processor to detect an ingress node fault along a first source path using one or more fault detection links.

18. The apparatus of claim 16, wherein the status identifier switches from the inactive state to the active state following an ingress node fault along a first source path.

19. The apparatus of claim 16, wherein data traffic is received from a first source path when an ingress node fault along the first source path is not present, wherein data traffic is received from a second source path when the ingress node fault along the first source path is present, wherein data traffic is transmitted using the forwarding entries for the network nodes along the primary LSP when the ingress node fault along the first source path is not present, and wherein data traffic is transmitted using the forwarding entries for the network nodes along the backup LSP when the ingress node fault along the first source path is present.

* * * * *